United States Patent [19]

Tripke

[11] Patent Number: 4,943,076
[45] Date of Patent: Jul. 24, 1990

[54] SAFETY TRAILER STEP

[76] Inventor: Randall K. Tripke, Rte. 1, Box 62, Malone, Wis. 53049

[21] Appl. No.: 244,015

[22] Filed: Sep. 14, 1988

[51] Int. Cl.$^5$ .............................................. B60R 3/00
[52] U.S. Cl. .................................. 280/166; 280/169; 280/414.1; 105/449; 108/44; 114/344; 182/90
[58] Field of Search ............... 280/163, 165, 166, 169, 280/291, 414.1, 164.1, 164.2, 47.331; 52/182, 183, 188; 105/443, 449, 450; 108/44; 114/344; 182/90, 92; 296/75

[56] References Cited

U.S. PATENT DOCUMENTS

| | | | |
|---|---|---|---|
| 1,146,399 | 7/1915 | Brown | 280/164 A |
| 1,865,365 | 6/1932 | Foote | 280/165 X |
| 3,379,452 | 4/1968 | Torrisi | 280/414.1 X |
| 3,779,580 | 12/1973 | Thelen | 280/164 R |
| 3,833,240 | 9/1974 | Weiler | 280/166 |
| 3,980,319 | 9/1976 | Kirkpatrick | 280/166 |
| 4,023,821 | 5/1977 | Eiland | 280/291 |
| 4,056,270 | 11/1977 | Greenfield | 280/166 |
| 4,116,457 | 9/1978 | Nerem et al. | 280/166 |
| 4,140,327 | 2/1979 | Hackney, III | 280/166 X |
| 4,289,819 | 9/1981 | Kalman | 280/169 X |
| 4,524,701 | 6/1985 | Chappell | 108/44 |
| 4,620,609 | 11/1986 | Elsten | 182/92 |
| 4,733,752 | 3/1988 | Sklar | 280/166 X |

Primary Examiner—Charles A. Marmor
Assistant Examiner—Brian L. Johnson
Attorney, Agent, or Firm—Donald Cayen

[57] ABSTRACT

A safety trailer step provides improved footing for a person launching or loading a boat onto a trailer. The safety trailer step comprises a step formed with a platform and two parallel side plates. The side plates snugly receive the trailer tongue therebetween and extend below the tongue. Tightening bolts through the side plates sandwiches the tongue therebetween to rigidly mount the safety trailer step to the trailer tongue. The platform may be centered over the tongue, or it may be laterally offset therefrom. A non-skid plastic plate may be attached to the platform upper surface. The present invention includes spacers that fit between the tongue and the step such that the safety trailer step can be used with a variety of trailer tongue widths.

6 Claims, 2 Drawing Sheets

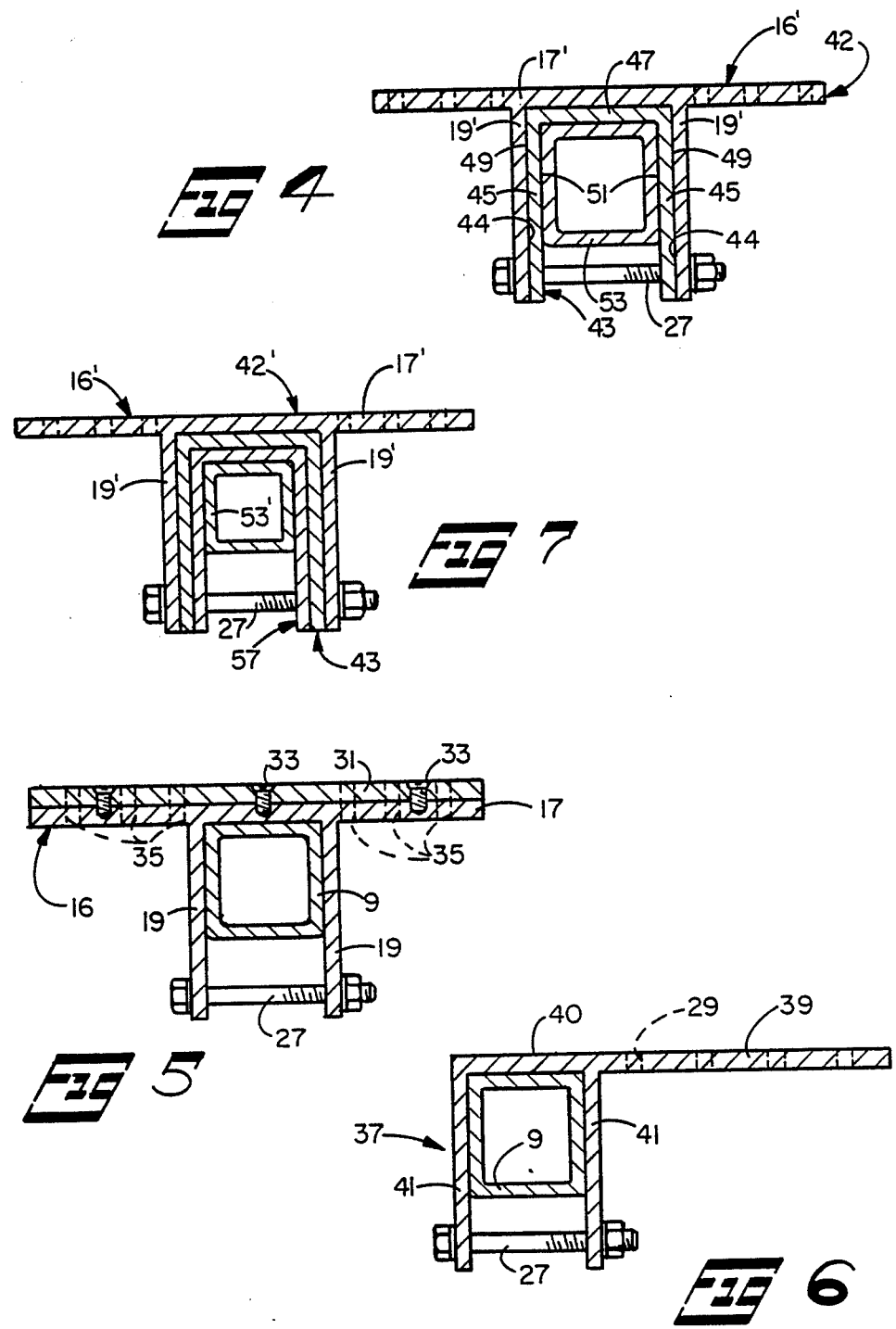

SAFETY TRAILER STEP

BACKGROUND OF THE INVENTION

1. Field of the Invention

This invention pertains to safety devices, and more particularly to safety apparatus associated with small boat trailers.

2. Description of the Prior Art

Trailers for transporting and launching small boats are well known. Such trailers usually have a frame section that supports the boat, an elongated tongue for connecting the boat-supporting frame section to a towing vehicle, and wheels that support the frame section above the ground. When launching or loading a boat, the trailer is backed down a ramp to submerge the wheels and frame section. The tongue also is usually at least partly submerged. The boater often must step on or walk along the tongue to push the boat from the trailer at launching and to winch the boat back onto the trailer after use.

The danger of personal injury due to slipping and falling when walking on a wet trailer tongue is well recognized. To overcome that danger, it is known to provide trailers with supplemental footing means. For example, U.S. Pat. No. 4,056,270 shows a boat trailer step having a slotted foot plate clamped to a trailer tongue by long bolts. The Wesbar Corporation of West Bend, Wis., manufactures a walk ramp that is somewhat similar to the step of the 4,056,270 patent. The designs of both of the foregoing products render them somewhat less sturdy and rigid than is desired.

The EZ Loader Boat Trailer Company of Spokane, Wash., manufactures a trailer with aluminum diamond tread steps fixed to the outsides of the boat-supporting frame section. Another EZ Loader trailer includes a carpeted walk board attached to the insides of the boat supporting section. The EZ Loader walk boards and steps are located far from the trailer tongue, so they do not assist a person to maintain his footing when standing on the tongue when launching or loading his boat.

Thus, a need exists for improved means for assuring the safety of persons using small trailers to launch and load boats.

SUMMARY OF THE INVENTION

In accordance with the present invention, a versatile safety trailer step is provided that supports a person on the tongue of a trailer in a safe and rigid manner. This is accomplished by apparatus that includes a step having a non-skid platform mounted to the trailer tongue by means of side plates that snugly straddle and grip the tongue sides.

The step side plates are perpendicular to the platform, and they are preferably integrally joined to the platform. The side plates may be approximately centered on the platform, or they may be closer to one platform end than the other. The side plates have lengths such that when the platform rests on the top surface of a trailer tongue, the side plate free ends extend beyond the tongue bottom surface. Aligned holes in the side plate free ends receive bolts for connecting the side plates to each other to rigidly sandwich the trailer tongue therebetween. Loosening the bolts enables a person to slide the safety trailer step to any desired location along the trailer tongue.

Further in accordance with the present invention, the safety trailer step is designed to be rigidly mountable to trailer tongues of different sizes. For that purpose, the step side plates are spaced apart a distance only slightly greater than the width of the largest trailer tongue on commonly available trailers. When used with that size tongue, the step of the present invention fits snugly over the tongue for being rigidly mounted thereto by the bolts. To use the safety trailer step with trailers having narrower tongues, the present invention includes one or more generally U-shaped spacers. The spacers are designed to nest within the space defined by the step side walls and adjoining portion of the platform. The spacer side walls take up the clearance between the step side plates and the narrower trailer tongue. Holes in the free ends of the spacer side walls are aligned with those in the step side plates for receiving the mounting bolts therethrough.

Other advantages, benefits, and features of the present invention will become apparent to those skilled in the art upon reading the detailed description of the invention.

BRIEF DESCRIPTION OF THE DRAWINGS

FIG. 4 is a cross sectional view similar to FIG. 3 but showing a spacer that comprises the present invention.

FIG. 5 is a view similar to FIG. 4 but showing a modified embodiment of the present invention.

FIG. 6 is a view similar to FIG. 4 but showing another modified embodiment of the present invention.

FIG. 7 is a cross sectional view similar to FIG. 4 but showing an additional spacer that comprises the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
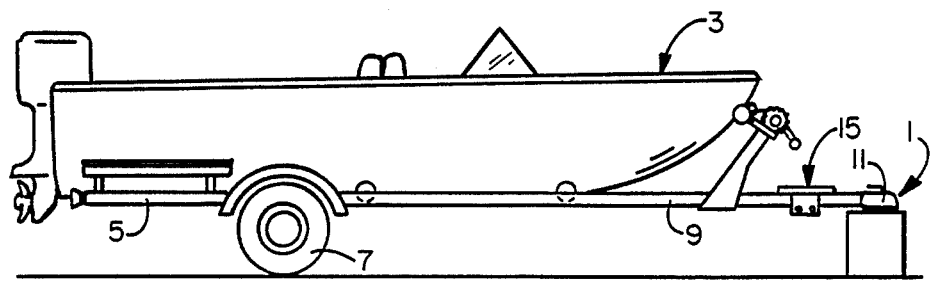
FIG. 1 is a side view of a typical boat trailer with the safety trailer step of the present invention mounted thereon.

Referring to FIG. 1, a trailer 1 is illustrated that includes the present invention. The specific trailer shown is particularly useful for transporting and launching small boats 3, but it will be understood that the invention is not limited to marine applications.

The typical trailer 1 includes a boat-supporting frame section 5 supported by wheels 7, as is known in the art. An elongated tongue 9 connects the frame section 5 to a towing vehicle, not shown, by a hitch 11. When launching or loading the boat 3 at a ramp, the frame section and wheels 7 are under water, and a portion of the tongue 9 is also usually at least partially submerged.

Figure 2:
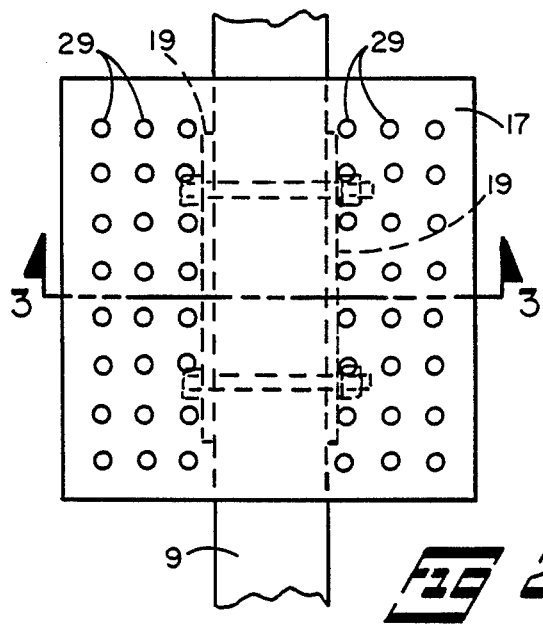
FIG. 2 is a top view of the safety trailer step according to the present invention.
Figure 3:
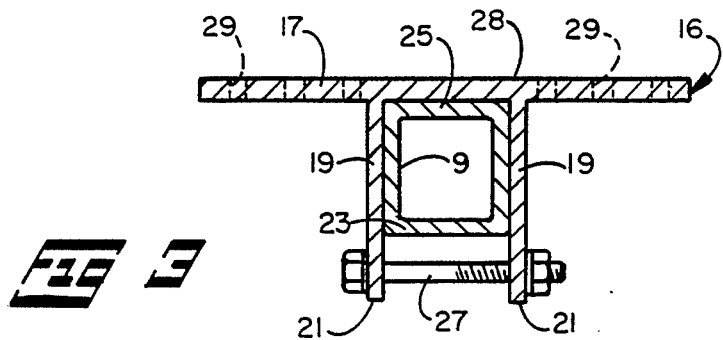
FIG. 3 is a cross sectional view taken along lines 3—3 of FIG. 2.

In accordance with the present invention, a safety trailer step 15 is mountable to the trailer tongue 9 to provide secure and dry footing for a boater when launching and loading the boat 3. Looking also at FIGS. 2 and 3, the safety trailer step 15 comprises a step 16 formed as a platform 17 and a pair of parallel side plates 19 connected to and depending from the platform. Preferably, the side plates 19 are integral with the platform 17. The side plates are spaced apart so as to snugly fit over the trailer tongue. The side plates are of a length such that the free ends 21 thereof extend beyond bottom wall 23 of the trailer tongue when the platform is resting against the tongue top wall 25. Bolts and nuts 27 squeeze the tongue between the side plates to thereby securely and rigidly mount the safety trailer step to the trailer tongue. Loosening the bolts and nuts 27 enables the safety trailer step to be repositioned to any desired location along the tongue.

The platform 17 and side plates 19 are preferably made of steel. The platform has a non-skid upper surface 28 and a series of openings 29 therethrough for water drainage. In an alternate construction, as shown in FIG. 5, a non-skid plastic plate 31 is attached to the upper surface 28 of the platform. The plastic plate 31 may be attached to the platform by flat head screws 33. Aligned openings 35 for water drainage extend through the plastic plate and the step platform.

In FIGS. 2-5, the safety trailer step 15 is shown with the platform 17 extending symmetrically over the side plates 19 and the trailer tongue 9. In FIG. 6, a modified safety trailer step 37 is shown in which the platform 39 extends to only one side of the side plates 41. The other aspects of the safety trailer step 37 may be substantially identical to the construction of the safety trailer step 15 described in conjunction with FIGS. 2 and 3. In addition, a non-skid plastic plate, not shown but substantially identical to the plate 31 described previously, may be attached to the top surface 40 of the platform 39 of the safety trailer step 37.

Further in accordance with the present invention, the safety trailer step is suited to be rigidly mounted to trailer tongues having a range of widths. Turning to FIG. 4, a safety trailer step 42 is depicted that includes a step 16' and a spacer 43. The step 16' is comprised of a platform 17' and a pair of side plates 19'. The inside surfaces 44 of side plates 19' are spaced apart to snugly fit over the widest tongue on commercially available trailers. The spacer 43 is generally U-shaped, having opposed side legs 45 and a center leg 47. The spacing across the outside surfaces 49 of the spacer side legs 45 is designed such that the spacer is able to snugly nest between the step side plates 19'. The inside surfaces 51 of the spacer side legs 45 are spaced apart to snugly fit over a commercially available trailer having a tongue 53 that is slightly narrower than the width of the tongue that snugly fits between the side plate surfaces 44. The free ends of the spacer side legs have holes that, when the spacer is nested within the step 16', are aligned with the holes in the side plates 19, for receiving the bolts 27.

Additional consecutively smaller spacers, such as spacer 57 illustrated in FIG. 7 and generally similar to spacer 43, may be used for successively narrower trailer tongues 53'. The additional spacers are nestable consecutively within the next larger size spacer. Each spacer is designed to receive a particular commercial width trailer tongue between the side legs thereof. Similarly, the additional spacers have holes that align with those in the spacer 43 and side plates 19' when those spacers are nested within the step 16'.

Thus, it is apparent that there has been provided, in accordance with the invention, a safety trailer step that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Safety apparatus for providing footing on a selected member comprising:
    a. a platform having upper and lower surfaces;
    b. a pair of side plates connected to and depending from the platform lower surface and generally perpendicular thereto, the side plates being spaced a predetermined distance apart to snugly fit over the selected member, the side plates having respective free ends that define at least one set of aligned holes therethrough;
    c. bolt means for passing through the aligned holes in the side plates and adjacent the selected member to rigidly mount the safely apparatus to the selected member; and
    d. at least one generally U-shaped spacer adapted to nest between the side plates and platform, the spacer having side legs that define holes that are aligned with the holes in the side plates when the spacer is nested between the side plates and the platform,
    so that the safety apparatus can be rigidly mounted to selected members having a variety of widths.

2. In combination with a boat trailer having a tongue of a predetermined width, a safety trailer step comprising:
    a. a first generally U-shaped spacer having side legs spaced apart to snugly receive the trailer tongue therebetween, the side legs having free ends that extend beyond the trailer tongue and that define at least one set of aligned holes therethrough;
    b. a step comprising:
        i. a platform having upper and lower surfaces; and
        ii. a pair of side plates connected to end depending from the platform lower surface and generally perpendicular thereto, the side plates being spaced apart a distance to snugly nest the spacer side legs therebetween, the side plates having respective free ends that define holes therethrough that align with the holes in the spacer nested in the step; and
    c. bolt means passing through the holes in the spacer side legs and step side plates for rigidly mounting the safety trailer step to the trailer tongue,
    so that the safety trailer step can be used on both trailers of two different tongue widths.

3. The combination of claim 2 further comprising a non-skid plastic plate attached to the platform upper surface, the plastic plate and step platform defining a plurality of aligned drain holes therethrough.

4. The combination of claim 2 wherein the step platform extends generally symmetrically over the side plates,
    so that the step platform is generally centered over the trailer tongue.

5. The combination of claim 2 wherein the step platform extends generally unsymmetrically over the side plates,
    so that the step platform is offset to one side of the trailer tongue.

6. In combination with a boat trailer having a tongue of a predetermined width, a safety trailer step comprising:

a. a plurality of generally U-shaped spacers having respective side legs spaced respective unequal distances apart to permit the spacers to nest consecutively within each other to form innermost and outermost spacers, the spacing between the side legs of the innermost spacer being spacer apart to snugly receive the trailer tongue therebetween, the side legs of all the spacers having free ends that extend beyond the trailer tongue when the trailer tongue is received within the innermost spacer and that define at least one set of aligned holes therethrough;

b. a step comprising:

i. a platform having upper and lower surfaces;
  ii. a pair of side plates connected to and depending from the platform lower surface and generally perpendicular thereto, the side plates being spaced apart to snugly nest the outermost spacer side legs therebetween, the side plates having respective free ends that define holes that align with the holes in the nested spacers; and c. bolt means passing through the holes in the spacers and step side plates for rigidly mounting the safety trailer step to the trailer tongue, so that the safety trailer step can be used on trailer tongues having a variety of widths.

* * * * *